United States Patent [19]

Caulfield

[11] Patent Number: 4,498,740
[45] Date of Patent: Feb. 12, 1985

[54] HOLOGRAM WRITER AND METHOD

[75] Inventor: H. John Caulfield, Nagog Woods, Mass.

[73] Assignee: Aerodyne, Research, Inc., Billerica, Mass.

[21] Appl. No.: 485,828

[22] Filed: Apr. 18, 1983

[51] Int. Cl.³ .............................................. G03H 1/08
[52] U.S. Cl. .................................... 350/3.66; 350/3.6
[58] Field of Search ........................ 350/3.6, 3.66, 3.67

[56] References Cited

U.S. PATENT DOCUMENTS 3,698,787  10/1972  Mueller et al. ..................... 350/3.66
4,109,996   8/1978  Ersoy ................................. 350/3.66

Primary Examiner—Bruce Y. Arnold
Attorney, Agent, or Firm—Frank A. Steinhilper

[57] ABSTRACT

A hologram is written from x, y, z data by presenting an information beam at a holographic medium with x and y coordinates represented by x and y position on the medium and z coordinates represented by distance between the holographic medium and a point position of the beam close to the medium, while simultaneously presenting a reference beam in interference with the information beam and of a size comparable with the size of the information beam at the holographic medium. The area of the information beam and the reference beam at any position on the holographic medium is a small fraction of the total area of the hologram.

9 Claims, 8 Drawing Figures

HOLOGRAM WRITER AND METHOD

BACKGROUND OF THE INVENTION

It has long been known that holograms can be created or written by suitable means such as, for example, by computer-generated signals. In one such system a large multiplicity of points in a volume, designated as x, y, z coordinates, are activated as point sources and coherent light from such point sources is directed to a holographic recording medium for recording in holographic interference with a coherent reference beam. One serious problem in connection with such computer-generated holograms is the immense number of points in a meaningful three dimensional record. For example, it is fully reasonable to wish to record a volume having 500 pixels or several times 500 pixels in each of the x, y, z coordinates and such three dimensional volume would therefore have more than $10^8$ pixels. For reconstruction or playback of a hologram recorded from such point sources, the available portion of the dynamic range of the holographic recording material for each image pixel is sharply decreased. As is well known, (a, b, c) sequential exposure of the holographic beam to $10^8$ equal exposures reduces the achievable point brightness by a factor of $10^8$ and playback reduces it by another factor of $10^8$ so that the point brightness is roughly $10^{-16}$ of that achievable if only a single point is used. This loss comes from the necessity of sharing the total exposure among N separate exposures so that each has only 1/N of the optimum exposure. The resulting minute fraction of the coherent light available for each pixel has stretched the dynamic range of the recording medium beyond its limit and has thus stretched the capability of reconstruction or playback by means of usual coherent sources. The capabilities of recording and reconstruction, to put it simply, are in the order of $(1/N) \times (1/N)$ where each N may be in the range of $10^8$ or much worse.

As a result of the forbidding problem of such hologram writing it is usual to pursue different courses and different methods of hologram writing. One such different method is disclosed in a copending U.S. application of Mueller and Caulfield Ser. No. 410,901 wherein a multiplicity of small cells of a hologram are successively recorded as a computer constructed hologram. When such a system is employed for hologram writing with a hologram whose cell may contain for example 200 μm × 200 μm squares with 2000 × 800 pixels to form a 7 cm × 7 cm hologram, it may well take a day and a half to write such a hologram at a rate of about three such cells per second.

Quite obviously there remains a need for a hologram construction system to form a hologram for three dimensional hologram recording for appropriate signals such as computer signals and to produce such a holographic recording in a reasonable time such as that generally known in the art as real time.

GENERAL NATURE OF THE INVENTION

According to the present invention a small point of coherent radiation is created close to or on a recording medium, and such closely adjacent point is moved in x, y, z coordinates at or close to the holographic recording medium whose a correspondingly small segment of a coherent beam is moved in register with such point to create holographic interference. One of such coherent beams, such as the first beam, is an information beam while the other or second beam is a reference beam. The point radiation is directed to the holographic recording medium in a limited angle or limited filed of view to form a holographic interference pattern in a small fraction of the entire hologram area. Rapid sequencing produces or writes the entire hologram extremely quickly, essentially in real time.

For reconstruction of playback of the recording, a like coherent beam illuminates the entire hologram to present a visual and intelligible reconstruction of the composite recorded signal. The result is the formation of holographic hard copy of a computer-generated image, including the ability to view such an image in a matter of seconds or minutes after its creation rather than waiting for a matter of hours or days. The quickness of access to a viewable record makes the system practical for numerous uses and applications where holography previously was impractical.

The general nature of the invention having been set forth, the invention may be more fully understood in connection with the drawings in which.

Figure 1:
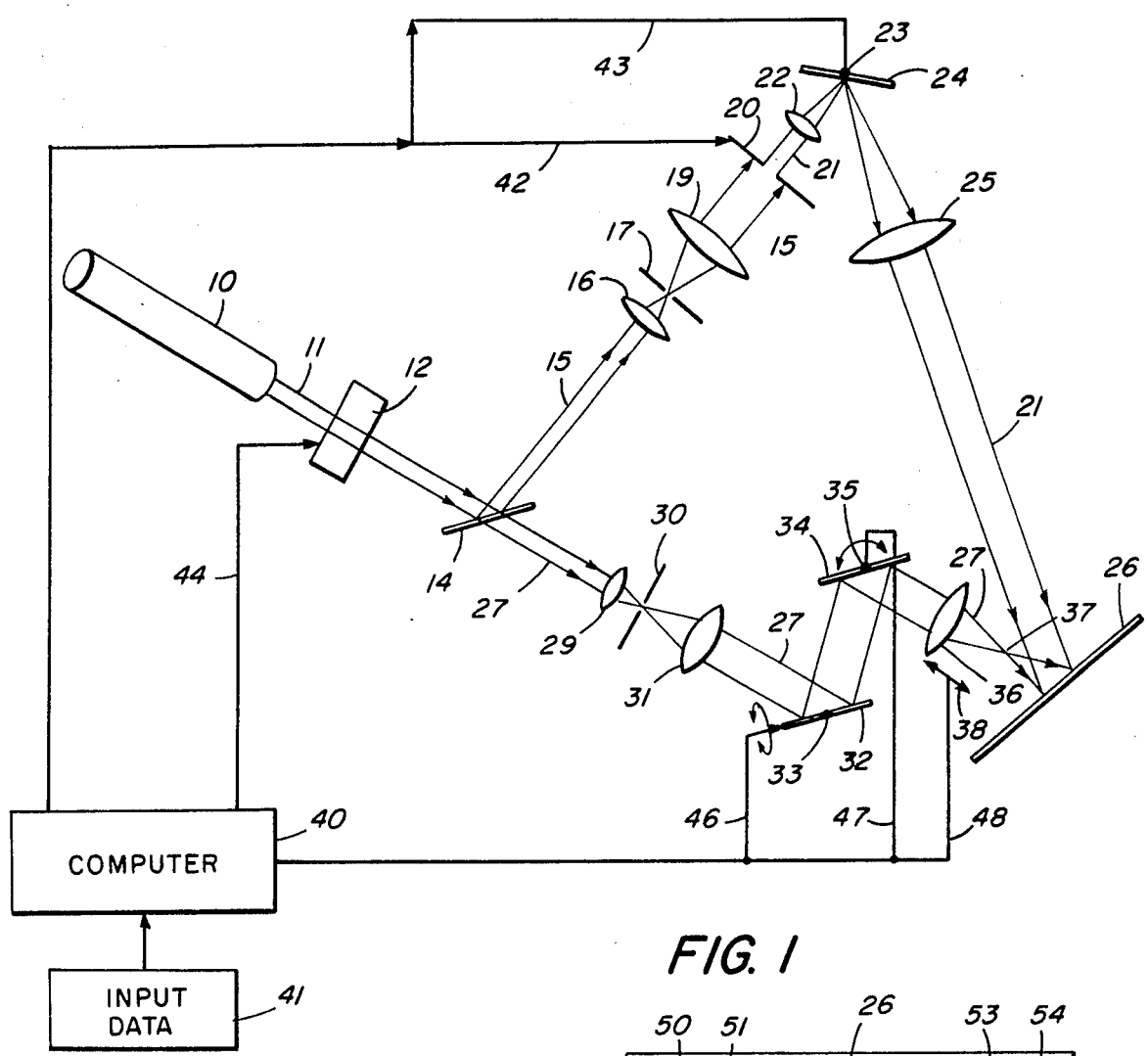
FIG. 1 is a diagrammatic view of hologram writing apparatus according to one embodiment of the invention.
Figure 4:
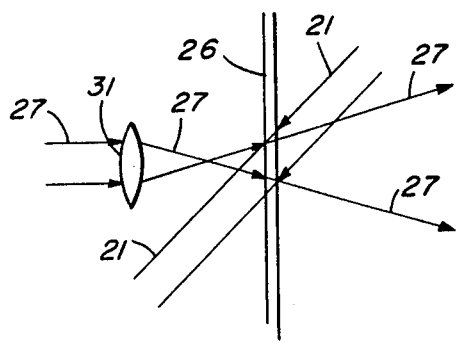
Figure 3:
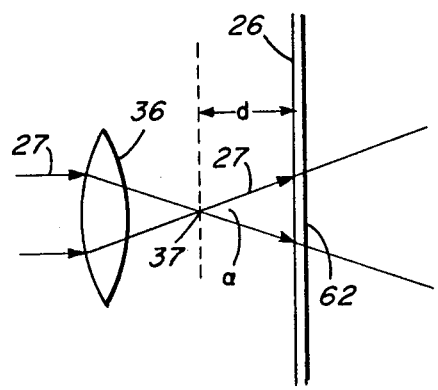
Figure 5:
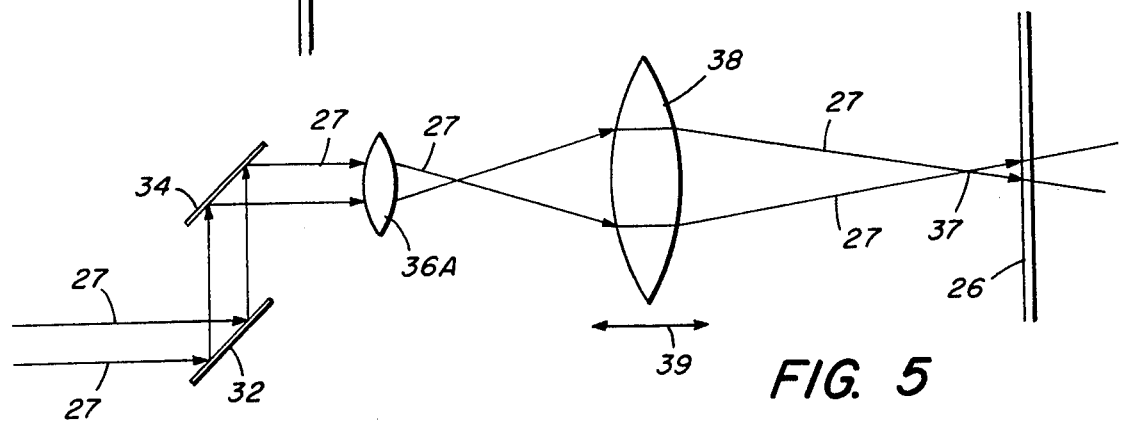
Figure 6:
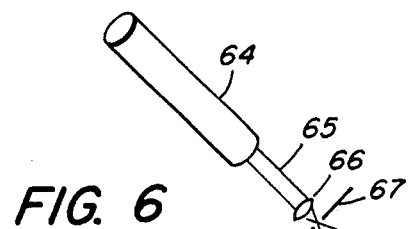
Figure 7:
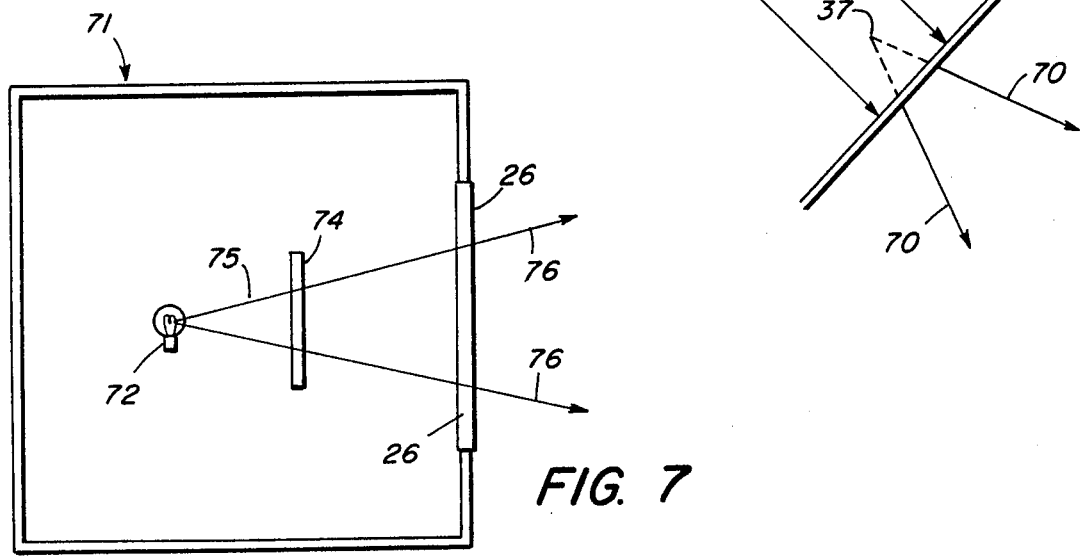
Figure 8:
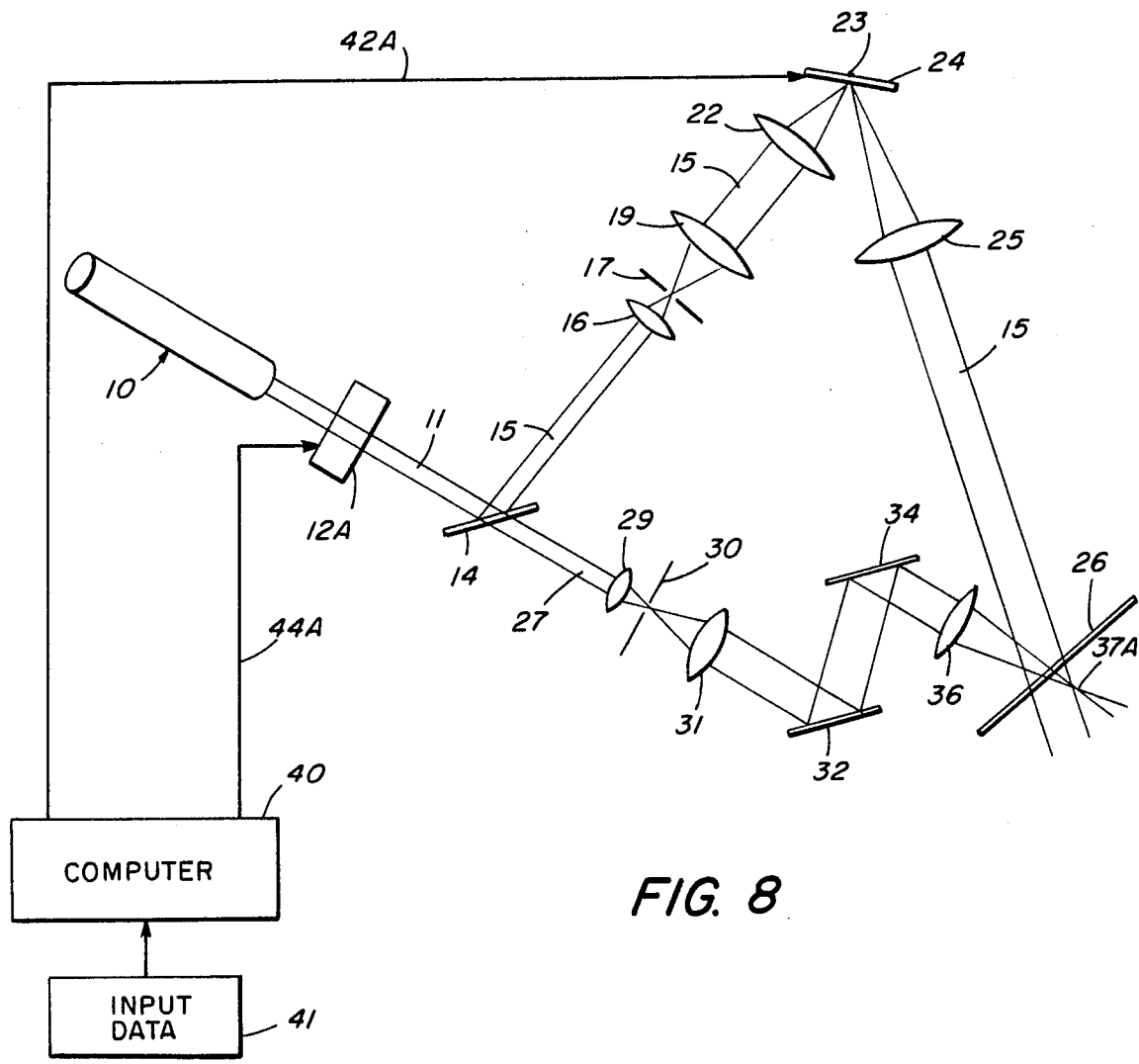

In FIG. 3 is shown a segment of the apparatus of FIG. 1, illustrating the focus of a hologram area on the recording medium;

FIG. 4 is a fragmentary view of hologram apparatus according to another embodiment of the invention;

FIG. 5 is a fragmentary portion of hologram apparatus according to still another embodiment of the invention;

FIG. 6 is a diagrammatic view of conventional playback apparatus useful according to the invention;

FIG. 7 is a diagrammatic view of other playback apparatus useful according to the invention;

FIG. 8 is a diagrammatic view of holographic apparatus according to another embodiment of the invention.

SPECIFIC DESCRIPTION OF THE INVENTION

In FIG. 1 a laser 10 directs a beam 11 of coherent light to and through a modulator 12 such as an electronic shutter and thence to a beam splitter 14. From beam splitter 14 one portion 15 of the beam, intended to act as the reference beam, is directed to a lens 16 focusing the beam 15 essentially at a point at the location of a pinhole 17 where extraneous light is cleaned up. From a pinhole 17 the beam expands to a collimating lens 19. Beam 15 is then directed to a controlled iris 20, letting through a reference beam 21 of controlled diameter. Beam 21 then passes to a lens 22 to focus the beam onto a rotating mirror 24. As shown, mirror 24 is mounted on a central point 23 or central axis and is rotatable in both directions around axis 23. A mirror mount of this kind is commercially available from Newport Corporation as Model 620 Mirror Mount. Desirably the micrometers of this mount are motor driven. From motor 24 beam 21 goes to a second collimating lens 25 from which the now collimated beam 21 is directed to a holographic recording member 26 such as photo member.

Reference beam 21 as shown is collimated and therefore comes from a point source to medium 26. Reference beam 21 could be either convergent or divergent instead of collimated. Such beams also come from point sources. It is not necessary that reference beam 21 appear to come from one point. It suffices that it come from a multiplicity of point sources, at most one per image point, within a confined region of space much farther from the hologram than any image point.

From beam splitter 14 the other portion of beam 11 passes through beam splitter 14 and becomes information beam 27 and is directed to lens 29, focusing at a pinhole 30 and to a collimating lens 31 as an expanding beam. Lens 31 directs a collimated beam 27 to a first mirror 32 rotatable in one direction on its axis 33 and thence to a second rotatable mirror 34 rotatable on an axis 35 orthogonal to axis 33. Rotation of mirrors 32 and 34 at right angles to each other provides x and y positioning to beam 27. If desired the two mirrors can be replaced by a single mirror rotatable in both directions, such as mirror 24.

From mirror 24 information beam 27 is directed to a movable collimating lens 36, movable toward or away from mirror 34 as indicated by arrow 38 and toward or away from recording member 26, to focus beam 27 to and through a point 37 and to recording member 26. Thus beam 27 reaches recording memdium 26 in conjunction with a point source, being moved in the x and y coordinates by mirrors 32 and 34 and being moved in the z coordinate and changed in size by the motion of lens 36.

Point 37 is located close to recording member 26. As illustrated in FIG. 1, point 37 is in front of medium 26 and is close thereto so that the beam 27 from point 37 reaches only a fraction of the total area of medium 26 at any x, y, z coordinate. With control of the position of lens 36, the z data point can be positioned essentially on recording medium 26 or at a variable position before or beyond medium 26 to represent a desired z position. Simultaneously the size of reference beam 21 is controlled by iris 20 to represent the condition of the z coordinate and the x, y directions of mirror 24 is controlled to be at the same x, y position as beam 27 as well as being of the same size as beam 27 to produce holographic interference between information beam 27 and reference beam 21.

Also shown in FIG. 1 is a computer 40, receiving input data from an input source 41 and sending: control signal 43 to mirror 24 for x and y control of reference beam 21; control signal 48 to lens 36 for z control of information beam 27; control signal 43 to mirror 24 for x and y control of reference beam 21; and control signals 46 and 47 to mirrors 32 and 34 for x and y control of information beam 27. When beams 21 and 37 are correctly positioned according to x, y, z data points, computer 40 send a control signal 44 to modulator 12 to pulse beams 21 and 27.

In operation, laser 10 is activated and mirror 24 and iris are set to direct reference beam 21 across medium 26 in location and size to coordinate with x, y, z data. Simultaneously, mirrors 32 and 34 and lens 36 are set in motion and in position to direct information beam 27 to a moving point 37 which simultaneously corresponds to x, y, z data in register with the size and position of reference beam 21. Computer 40 monitors x, y, z positions, and pulses beams 21 and 27 to provide holographic interference according to the input x. y. z data.

Figure 2:
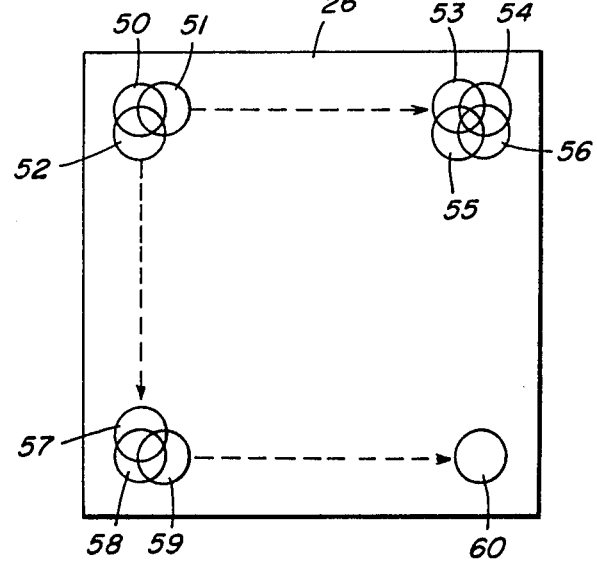
FIG. 2 is a diagrammatic view of a face view of a holographic recording medium according to the embodiment of the invention shown in FIG. 1.

In FIG. 2 holographic medium 26 has a first exposure area corresponding to a first position of point 37 in x-1, y-1, z-1 position. FIG. 2 being a front face view, the z coordinates are not shown except that the z data position is embodied in the size of the area which beam 27 strikes on the medium. In the x-1, y-1, z-2 position of point 37, information beam 27 from point source 37 is beamed to a small area 50 of the holographic recording medium, shown here as about one tenth of the diameter or dimensions of member 26. Also shown in FIG. 2 is a second area 51, corresponding to x-1, y-2, z-1, and a third area 52 corresponding to x-2, y-1, z-1, these areas significantly but not completely overlapping. At another place on medium 26 is shown another group of areas, these areas 53, 54, 55 and 56 also significantly overlapping. Area 54 corresponds to the position x-n, y-1, z-1, area 53 is x-m, y-1, z-1, area 55 is x-m, y-2, z-1, and area 56 is x-n, y-2, z-1. Similarly at another place on medium 26 are areas 58 and 59, and at a fourth place is area 60, corresponding to x-n, y-n, z-1. Across the entire area of medium 26 are areas correspondingto x-1, x-2, x-3 . . . x-n; y-1, y-2, y-3 . . . y-n; and fixed z-1 points. Similarly throughout medium 26 are areas (not shown) corresponding to other z coordinates z-2, z-3 . . . z-n, with the size of beam area at medium 26 corresponding to the z data point. As can be seen, the multitudinous areas 50, 51, 52 . . . 60 have been recorded from point source 37 as it has been moved in the coordinate directions, in synchronism with corresponding motion of reference beam 21. The scan in the three dimensions can be in any desired order; scanning of one z plane at a time is very convenient.

Playback of the hologram, or holographic reconstruction, can be achieved in the usual manner by means of a reference beam in the position of beam 21 and covering the entire area of member 26, and may as hereinbefore stated originate from a point source without serious degradation of image. The viewer's eye or other image receiving member is positioned within the field of view of the expanding information beam as projected from point source 37, being within that field of view from any position or point within the recording medium for motion of point 37 along and across x-1 to x-n data points and y-1 to y-n data points, and the eye sees an apparently normal view.

In FIG. 3, a segment of the apparatus of FIG. 1 includes lens 36, recording member 26 and information beam 27 directed to lens 36 as a collimated beam emerging from lens 36 as a beam focused at a point 37. Beam 27 emerges from point source 37 at a distance d from member 26, expanding toward and reaching medium 26 at an area or spot 62. Area 62 may correspond to any of areas 50, 51, 52 . . . 60 of FIG. 2. Beam 37 focuses at point 37 and emerges from that point 37 at an angle or field of view designated α. The size of area 62, as is apparent, depends on the distance d between point 37 and an angle α. As is known to one skilled in the art, a human eye or other viewing member will see a normal holographic wave front when the eye is thus within the field of view of all the areas 50, 51, 52 . . . 60. Meanwhile, the number of data points recorded within area 62 or overlappingly within portions of area 62 is a fraction of the total number of data points in the entire hologram, such fraction depending on $A_1/A_2$ where $A_1$ is the total area of area 62 and $A_2$ is the area of the entire hologram or the area of entire medium 26. In addition, the detailed pattern being written affects the nature and amount of pattern overlap. In all cases, however, the present hologram differs from a conventional hologram or from a hologram such as that written according to the system of Mueller and Marom U.S. Pat. No. 3,698,787 in that each and every data point in a conventional hologram is recorded throughout the entire hologram area (or for comparison with the present invention, throughout the entire area of medium 26).

In the view shown in FIG. 3, the area or fractional area of spot 62 may be controlled by maintaining the angle α as a relatively small angle so the viewer views the hologram from within such angle by keeping point 37 close to member 26 or by a combination of angle and distance. No fixed limits are easily stated, but in conventional holographic practice it is usual to view a hologram within a field of view of about 20° to about 90°.

In order to maintain a small size for spot 62 it is desirable to maintain a small distance d between z data point and member 26, and thus z data points should be closely adjacent to member 26, positioned thereon, or positioned some on one side of member 26 and some on the other side of member 26, depending on the value of z.

In conventional holography, or in hologram writing according to procedures and methods such as those of Mueller and Marom U.S. Pat. No. 3,698,787, all of the data points in the hologram are spread across the entire hologram area and as indicated hereinbefore, such a hologram may well have more than $10^8$ pixels, severely stretching the capabilites of the system. Accordingly it is important to keep area 62 and like areas to a small fraction of the total hologram area. If in record number 26, area 62 has a diameter no larger than ¼ the length or width of member 26 the consequent requirements placed on the system are reduced by $(¼)^2$ or reduced to 1/16 of that in conventional holography. If area 62 has a diameter no more than 1/10 the dimensions of member 26, the strain on the system is reduced by $10^2$ with a consequent major increase in quality. In a system for computer writing of holograms according to the present invention an area reduction of as much as 1:100 is quite straightforward and area reductions may well reach as much as 1:10,000 to bring about wholly new holographic capabilities.

In FIG. 1 is a portion of a hologram system having a lens 31 such as the lens of like designation in FIG. 1, directing information beam 27 to recording medium 26 as in FIG. 1. A reference beam 21 is directed from beam splitter (not shown) to recording medium 26 from the opposide of such medium. As is apparent to those skilled in the art, this modification produces a reflection hologram.

In FIG. 5 is a portion of a hologram system having information beam 27 directed to mirror 32 and thence to mirror 34 and through lens 36. Lens 36 in this embodiment is in fixed position and beam 27 is directed from lens 36A movable in and out as indicated by arrow 39, to focus beam 27 at a movable point source 37 and thence in an expanding beam to member 26. In this embodiment, first lens 36 may be positioned in a location which is tightly restricted or limited, and the z data point movement is produced by movement of lens 36A.

In FIG. 6 is a conventional playback or reconstruction apparatus for hologram 26, having a laser 64 positioned to direct playback laser beam 65 to a lens 66, through a pinhole 67 and to a collimating lens 68. From lens 68 beam 65 is directed toward hologram 26 in the usual manner. As is known, a portion of playback beam 70 of the visual image appears to originate at the original location of point 37 and emerges in the form of visible hologram wavefront 70.

The method and apparatus of the present invention makes possible the quick writing and availability of computer-operated hologram writing thus making appropriate for various uses and applications a portable hologram viewer or playback device for immediate or prompt viewing where desired. One such device is shown in FIG. 7. A hologram playback device generally designated 71 has a point light source or point source bulb 72, a transparent color filter 74 which is transmissive in substantially the same wave length as the laser 10 of FIG. 1. A light beam 75 from light 72 passes through filter 74 to hologram 26 mounted on device 71. Emerging from device 71 is a playback holographic wavefront 76 providing satisfactory playback of the hologram when filter 74 closely corresponds with laser 10.

In FIG. 8 a modified device according to another embodiment of the invention has a laser 10 directing a beam of coherent radiation 11 to a continuously variable light modulator 12A passing an intensity of radiation according to a signal 44A from computer 40. Modulated beam 11 is directed to beam splitter 14 forming an information beam 27 and a reference beam 15. Beam 15 goes to lens 16 where it is focused to a point at pinhole 17 and expands to lens 19. Beam 15 from collimating lens 19 is directed without iris control to lens 22 where it is focused to a point substantially at the pivot point 23 of mirror 24. By reflection, beam expands to lens 25 where it is collimated as reference beams of substantially fixed size in an x, y direction which is determined by a signal from computer 40 to mirror 24. The direction of beam 15 thus contains the x, y data information in a beam of substantially fixed z data size to act in conjunction with the information beam.

From beam splitter 14, information beam 27 passes to lens 29, through pinhole 30, to mirrors 32 and 34, through movable lens 36, through recording medium 26 and to a focal point 37A beyond medium 26. In this position as shown, point 37A represents a z data point equivalent to a three dimensional location beyond medium 26.

I claim:

1. Apparatus for hologram writing to record individual x, y, z data points on a holographic medium comprising
    means to support a holographic medium,
    means to generate coherent radiation and to form an information beam and a reference beam of said coherent radiation,
    means to modulate said information beam comprising to x, y, z data,
    means to focus said information beam at beam focal points at z positions adjacent to said holographic medium on said support means and to present said beam to said holographic medium in individual areas, each corresponding to a fraction of the total area of said medium,
    means to move said information beam across and along said holographic medium at positions corresponding to x, y, z data positions, and
    means to present said reference beam to said holographic medium in interference with said information beam and to move said reference beam across and along said medium in conjunction with and in interference with said information beam.

2. The apparatus of claim 1 wherein said means to focus is adapted to focus said information beam at a point close to said holographic medium and to direct said information beam to said holographic medium at an angular field of presentation whereby the size of the beam at said holographic medium represents the z coordinate postion of said x, y, z data point.

3. The apparatus of claim 1 wherein said means to move said information beam across and along said holographic medium and said means to present said reference beam to said holographic medium are positioned on opposite sides of said holographic medium.

4. The apparatus of claim 1 wherein said means to move said information beam across and along said holographic medium and said means to present said reference beam to said holographic medium are positioned on the same side of said holographic medium.

5. A method of writing a hologram from data representing x, y, z coordinate information comprising
focusing a coherent information beam with a predetermined field of view to a point closely adjacent to a holographic recording medium,
establishing a controlled z point at a predetermined position distance from a plane at the holographic medium, said predetermined position distance representing a z data point for said data, and controlling the focal point of said information beam to coincide with said z data point while containing said distance such that the area of said information beam at said holographic recording medium for the predominant proportion of individual z values is a small fraction of the total area of said holographic medium,
presenting said information beam across and along said medium to areas corresponding to the x, y, z data points of said information for a multiplicity of times corresponding to a multiplicity of x, y, z data points,
simultaneously directing a coherent reference beam to said medium in interference with said information beam with an area approximately the size of the area of the information beam at the holographic medium, and
presenting said reference beam simultaneously and in conjunction with said information beam and moving the beams across and along said holographic recording medium to produce interference corresponding to x, y, z data.

6. The method of claim 5, wherein during a single hologram recording a substantial fraction of the total number of z positions are on one side of the holographic medium and a substantial fraction of the total number are on the opposite side of said holographic medium.

7. In the method of claim 5, controlling said information beam and said reference beam to pulse at desired data points.

8. In the method of claim 5, controlling said information beam to produce a continuously variable intensity at data points.

9. Apparatus for hologram recording to record individual x, y, z data points on a holographic medium comprising
means to support a holographic medium,
a laser,
a beam modulator located and positioned to receive and modulate a beam from said laser to impart information thereto,
a beam splitter positioned and adapted to separate a beam from said laser into a coherent information beam and a coherent reference beam,
means to focus said information beam at a controlled distance position closely adjacent to said support means wherein said distance represents z data points and to direct said beam across and along a holographic medium on said support to positions representing x and y data points.
said focus means adapted and positioned to direct onto said holographic medium a small spot of said beam in a size at said holographic medium substantially smaller than the hologram area, wherein the size of said spot represents the z coordinate of a z data point, and
means to direct said reference beam to a holographic medium on said support in a size approximately equal to said spot and substantially smaller than said hologram area and to direct said reference beam across and along said holographic medium in register with said information beam to produce holographic interference between said reference beam and said information beam.

* * * * *